(12) United States Patent
Heeke et al.

(10) Patent No.: US 10,677,332 B2
(45) Date of Patent: Jun. 9, 2020

(54) HYBRID MODULE INCLUDING ELECTRIC MOTOR ON FRONT DIFFERENTIAL

(71) Applicant: Schaeffler Technologies AG & Co. KG, Herzogenaurach (DE)

(72) Inventors: Gregory Heeke, Wooster, OH (US); Peter Rentfrow, Smithville, OH (US); Peter Burke, Charlotte, NC (US); Md. Wasi Uddin, Akron, OH (US); Patrick Lindemann, Wooster, OH (US)

(73) Assignee: Schaffler Technologies AG & Co. KG, Herzogenaurach (DE)

( * ) Notice: Subject to any disclaimer, the term of this patent is extended or adjusted under 35 U.S.C. 154(b) by 44 days.

(21) Appl. No.: 16/013,716

(22) Filed: Jun. 20, 2018

(65) Prior Publication Data
US 2019/0128393 A1    May 2, 2019

Related U.S. Application Data

(60) Provisional application No. 62/560,511, filed on Sep. 19, 2017.

(51) Int. Cl.
*F16H 1/28* (2006.01)
*F16H 37/08* (2006.01)
*F16H 7/02* (2006.01)
*F16H 7/06* (2006.01)
*F16H 48/08* (2006.01)
*B60K 6/547* (2007.10)
*B60K 1/00* (2006.01)
*B60K 7/00* (2006.01)
*F16H 1/46* (2006.01)

(Continued)

(52) U.S. Cl.
CPC ............. *F16H 37/082* (2013.01); *B60K 1/00* (2013.01); *B60K 6/547* (2013.01); *B60K 7/0007* (2013.01); *F16H 1/28* (2013.01); *F16H 1/46* (2013.01); *F16H 7/02* (2013.01); *F16H 7/06* (2013.01); *F16H 48/08* (2013.01); *F16H 48/10* (2013.01); *B60K 2001/001* (2013.01); *B60K 2006/4808* (2013.01); *B60K 2006/4825* (2013.01); *B60K 2007/0038* (2013.01); *B60K 2007/0092* (2013.01); *F16H 3/66* (2013.01)

(58) Field of Classification Search
CPC ..... F16H 1/28; F16H 1/46; F16H 7/02; F16H 7/06; F16H 37/082; F16H 48/08; F16H 48/10; B60K 1/00; B60K 7/0007; B60K 2001/001; B60K 2007/0038; B60K 2007/0092
USPC ....................................................... 475/221
See application file for complete search history.

(56) References Cited

U.S. PATENT DOCUMENTS 8,292,769 B2   10/2012  Lawson, Jr.
9,222,565 B2   12/2015  Pichler et al.
(Continued)

FOREIGN PATENT DOCUMENTS

CN    106608178 A    5/2017

*Primary Examiner* — Leslie A Nicholson, III
(74) *Attorney, Agent, or Firm* — Davidson, Davidson & Kappel, LLC (57) ABSTRACT

A hybrid drive train assembly for a motor vehicle drive train includes an electric motor; a differential configured for connecting a first front axle and a second front axle of the motor vehicle drive train to each other; a motor output gearing connecting an output of the electric motor to the differential; and a transmission output gearing configured for connecting an output of a transmission to the differential.

20 Claims, 4 Drawing Sheets

(51) Int. Cl.
*F16H 48/10* (2012.01)
*F16H 3/66* (2006.01)
*B60K 6/48* (2007.10)

(56) References Cited

U.S. PATENT DOCUMENTS

| | | | |
|---|---|---|---|
| 9,593,754 B2* | 3/2017 | Sten | F16H 48/36 |
| 9,689,485 B1* | 6/2017 | Zhao | F16H 48/36 |
| 9,987,918 B2 | 6/2018 | Haupt | |
| 10,065,489 B2* | 9/2018 | Wang | B60K 1/00 |
| 10,195,930 B2* | 2/2019 | Endo | B60K 6/442 |
| 10,253,857 B2* | 4/2019 | LaForce | F16H 37/0813 |
| 2005/0272547 A1 | 12/2005 | House | |
| 2007/0060434 A1* | 3/2007 | Baasch | B60K 23/0808 475/18 |
| 2009/0105042 A1* | 4/2009 | Tanba | F16H 3/089 477/77 |
| 2014/0113760 A1 | 4/2014 | Diemer et al. | |
| 2015/0068831 A1* | 3/2015 | Ebner | B60K 1/00 180/243 |
| 2017/0274753 A1* | 9/2017 | Okuwaki | B60K 6/365 |
| 2019/0085961 A1 | 3/2019 | Shamie et al. | |

\* cited by examiner

Fig. 4

HYBRID MODULE INCLUDING ELECTRIC MOTOR ON FRONT DIFFERENTIAL

The present disclosure relates generally to hybrid motor vehicles and more specifically to positioning of electric motor in hybrid modules.

BACKGROUND

Hybrid motor vehicle drive trains including hybrid modules locate the electric motor near the rear axle or in the engine bay, either on the front of the engine or on the rear of the engine.

SUMMARY OF THE INVENTION

A hybrid drive train assembly for a motor vehicle drive train is provided. The hybrid drive train assembly includes an electric motor; a differential configured for connecting a first front axle and a second front axle of the motor vehicle drive train to each other; a motor output gearing connecting an output of the electric motor to the differential; and a transmission output gearing configured for connecting an output of a transmission to the differential.

In embodiments of the hybrid drive train assembly, the electric motor may include a stator and a rotor, the rotor may include a hollow drive shaft and an end of the hollow drive shaft may be connected to the motor output gearing. The motor output gearing may include a sun gear connected to the end of the hollow drive shaft. The motor output gearing may include planetary gears rotatably supported on teeth of the sun gear. The transmission output gearing may include an input gear configured for connecting to the output of the transmission. The motor output gearing may include a sun gear configured for transferring torque from the input gear to planetary gears rotatably supported on teeth of the sun gear. The motor output gearing may include a planet carrier non-rotatably fixed to a differential carrier of the differential. The electric motor, the motor output gearing and the transmission output gearing may be configured for each surrounding the first or second front axles. The electric motor and the motor output gearing may be configured for surrounding the first front axle. The transmission output gearing may be configured for surrounding the first front axle. The transmission output gearing may be configured for surrounding the second front axle. The differential may include a first output hub configured for connecting to an outer circumferential surface of the first axle and a second output hub configured for connecting to an outer circumferential surface of the second axle. The transmission output gearing may be directly drivingly connected to the differential. The motor output gearing may be directly drivingly connected to the differential. The motor output gearing may be drivingly connected to the differential via the transmission output gearing.

A method of constructing a hybrid drive train assembly for a motor vehicle drive train is also provided. The method includes providing a differential configured for connecting a first front axle and a second front axle of the motor vehicle drive train to each other; connecting a motor output gearing to an output of an electric motor; and connecting a transmission output gearing to the differential. The transmission output gearing is configured for connecting an output of a transmission. The motor output gearing connects the output of the electric motor to the differential.

In embodiments of the method, the electric motor may include a stator and a rotor, the rotor may include a hollow drive shaft, and the connecting of the motor output gearing to the output of the electric motor may include connecting an end of the hollow drive shaft to the motor output gearing. The motor output gearing may include a sun gear fixed to the end of the hollow drive shaft. The connecting of the transmission output gearing to the differential may include directly drivingly connecting the transmission output gearing to the differential. The method may include directly drivingly connecting the motor output gearing to the differential or drivingly connecting the motor output gearing to the differential via the transmission output gearing.

BRIEF DESCRIPTION OF THE DRAWINGS

The present invention is described below by reference to the following drawings, in which.

DETAILED DESCRIPTION

The present disclosure installs the e-motor attached to the differential. The e-motor can be packaged in the area normally occupied by the all wheel drive (AWD) power takeoff unit (PTU). This arranged allow ease of access to cooling systems already present on the vehicle.

As opposed to attaching the e-motor directly to the transmission output, the e-motor has an integral gear set to provide optimum torque and speed to match the transmission differential. The e-motor is attached directly to the final drive planetary gear set. As the transmission output to the differential is through the planetary carrier, the e-motor can then directly supplement the engine torque as required as well as recover energy via regenerative braking. With the transmission shifted to neutral, full electric driving can be achieved, and with e-motor not powered, conventional planetary automatic driving can be achieved. A clutch can be added to the e-motor system to remove the rotor inertia and lessen the power requirement to the e-motor to manage back electromotive force (EMF) when the motor is not in use.

In embodiments, the e-motor is in a concentric arrangement with the drive axle, allowing the e-motor to drive the differential while not displacing the original position of the axle. This minimizes design tear-up of an existing transmission and maximizes space available.

In one embodiment, the e-motor attaches to the differential or final drive planetary carrier. In this embodiment, the e-motor has approximately a 10:1 ratio included in the e-motor packaging.

In another embodiment, the e-motor attaches to the final drive sun gear. In this embodiment, the e-motor takes advantage of the reduction available in the final drive before feeding torque into the differential. This reduces the approximate gear ratio required in the e-motor to 3:1. This arrangement involves the traditional layout of the final drive and differential carrier being mirror. With the final drive and differential on the other side, it allows easy attachment of the e-motor output to the sun gear of the final drive planetary system.

Figure 1:
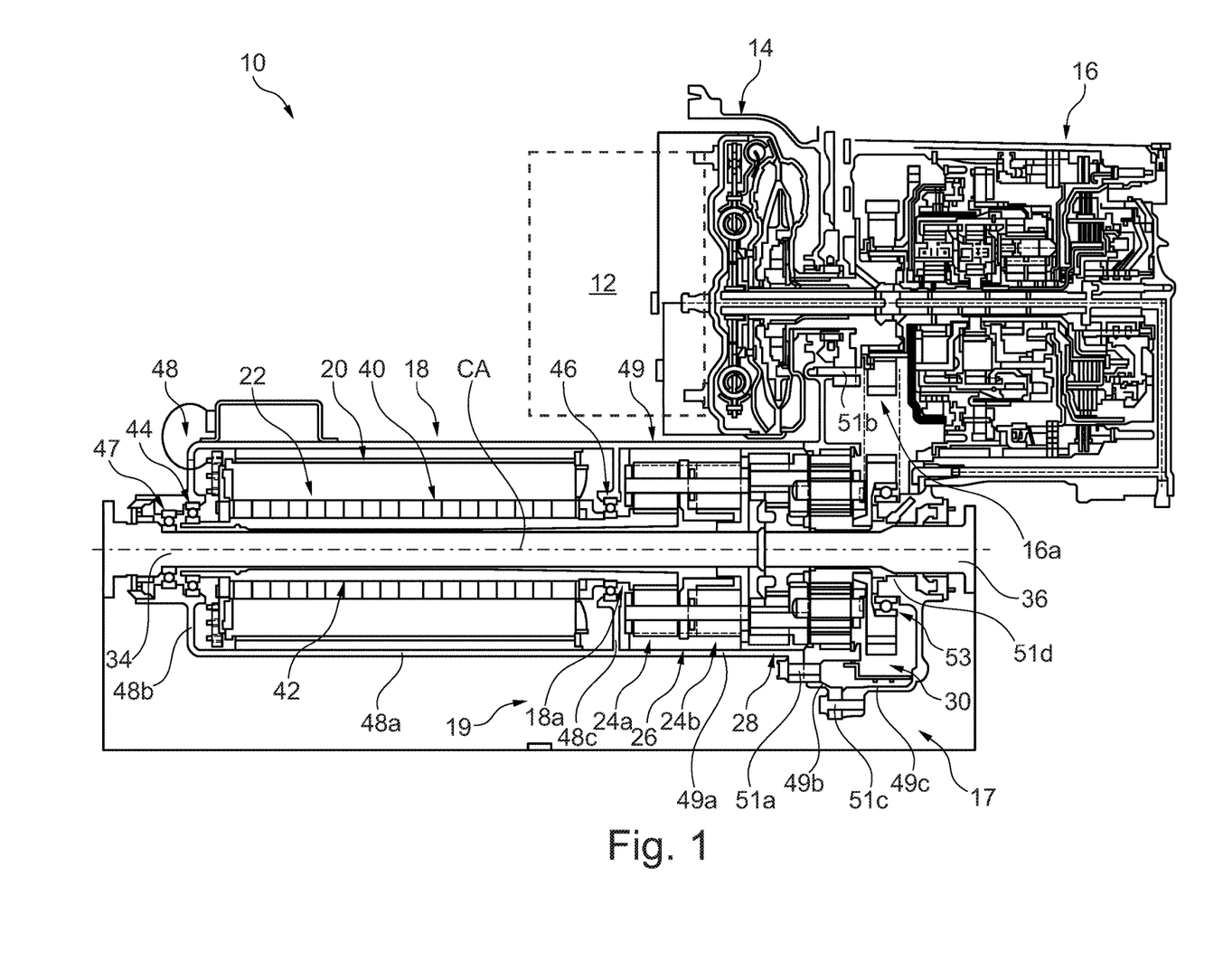
FIG. 1 shows an embodiment of a hybrid motor vehicle drive train in accordance with an embodiment of the present invention.

FIG. 1 shows an embodiment of a hybrid motor vehicle drive train 10 in accordance with an embodiment of the present invention. Drive train 10 includes an internal combustion engine 12, a torque converter 14 driven by a crankshaft of engine 12 and a transmission 16 whose input shaft is driven by torque converter 14. Drive train 10 further includes a hybrid drive train assembly 17 coupled to an output 16a of transmission 16. Hybrid drive train assembly 17 includes an electric motor 18 having an output 18a. Hybrid drive train assembly 17 further includes a gearing subassembly 19 configured for connecting outputs 16a, 18a to front axles 34, 36, which connect front wheels of the vehicle to each other. Gearing subassembly 19 includes a motor output gearing 26, a differential 28 and a transmission output gearing 30. Electric motor 18 and gearing subassembly 19 surround axles 34, 36 and electric motor 18, gearing subassembly 19 and axles 34, 36 are centered on a center axis CA, about which a rotor 22 of motor 18, gearing subassembly 19 and axles 34, 36 rotate during operation. The terms circumferentially, radially and axially are used in reference to center axis CA unless otherwise noted.

Electric motor 18 includes a stator 20 and rotor 22. The output 18a of motor 18 is attached by two stages 24a, 24b of motor output gearing 26, which is in the form of a gear reduction package, to differential 28. Transmission output gearing 30, which is in the form of a final drive and may have a fixed final drive ratio, is driven via output 16a of transmission 16 by a chain or belt 32. The output of differential 28 is fed through axles 34, 36.

Stator 20 includes winding, which may be formed of copper, and rotor 22 includes a plurality of magnets 40, which may be internal permanent magnets, supported on a hollow shaft 42. Rotor 22 is supported by two bearings 44, 46 at opposite ends of shaft 42 to support the rotor 22 and maintain the air gap between an outer diameter surface of the rotor 22 and an inner diameter surface of stator 20. Motor 18 further includes a motor housing 48 that supports stator 20 and bearings 44, 46. Housing 48 includes an axially and circumferentially extending base section 48a, which has a cylindrical shape, that is non-rotatably fixed to and surrounds the outer diameter of stator 20, a first support section 48b that extends radially inward from base section 48a along stator 20 and rotor 22 to support bearing 44 at an axial end of motor 18 that is distal from differential 28 and a second support section 48c that extends radially inward from base section 48a along stator 20 and rotor 22 to support bearing 46 at an axial end of motor 18 that is proximal to differential 28. First support section 48c supports an axle bearing 47 that rotatably supports axle 34, which extends inside of rotor shaft 42, such that motor 18 and axle 34 are located concentric with respect to each other. In some preferred embodiments, motor housing 48 including cooling passages located within it to allow oil or water flow for cooling of the motor 18. In one specific embodiment, the cooling passages may be cast into housing 48, with housing 48 having an inner wall and an outer wall with coolant in the void between the inner and outer walls. In another specific embodiment, there are seals on each end of stator 20, with o-ring style seals at each end and the coolant passages are formed by the outer wall of stator 20 and the inner wall of housing 48.

Hybrid drive train assembly 17 further includes a gearing housing 49 including a first gearing housing section 49a, which is fixed to and extends axially from support section 48c of motor housing 48, surrounding motor output gearing 26 and differential 28, and a second and third gearing housing sections 49b, 49c surrounding transmission output gearing 30. Second gearing housing section 49b is fixed to and extends axially from first gearing housing section 49a and third gearing housing section 49c is fixed to and extends axially from second gearing housing section 49b. Housing section 49a is fastened directly to housing section 49b via fasteners 51a. Housing section 49b is configured for fastening directly to a transmission housing 18b via fasteners 51b and is fixed to housing section 49c via fasteners 51c. Housing section 49c extends radially inward from fasteners 51c to form a hub section 49d for supporting a bearing 53. Housings 48, 49 together form a housing of hybrid drive train assembly 17.

Figure 2:
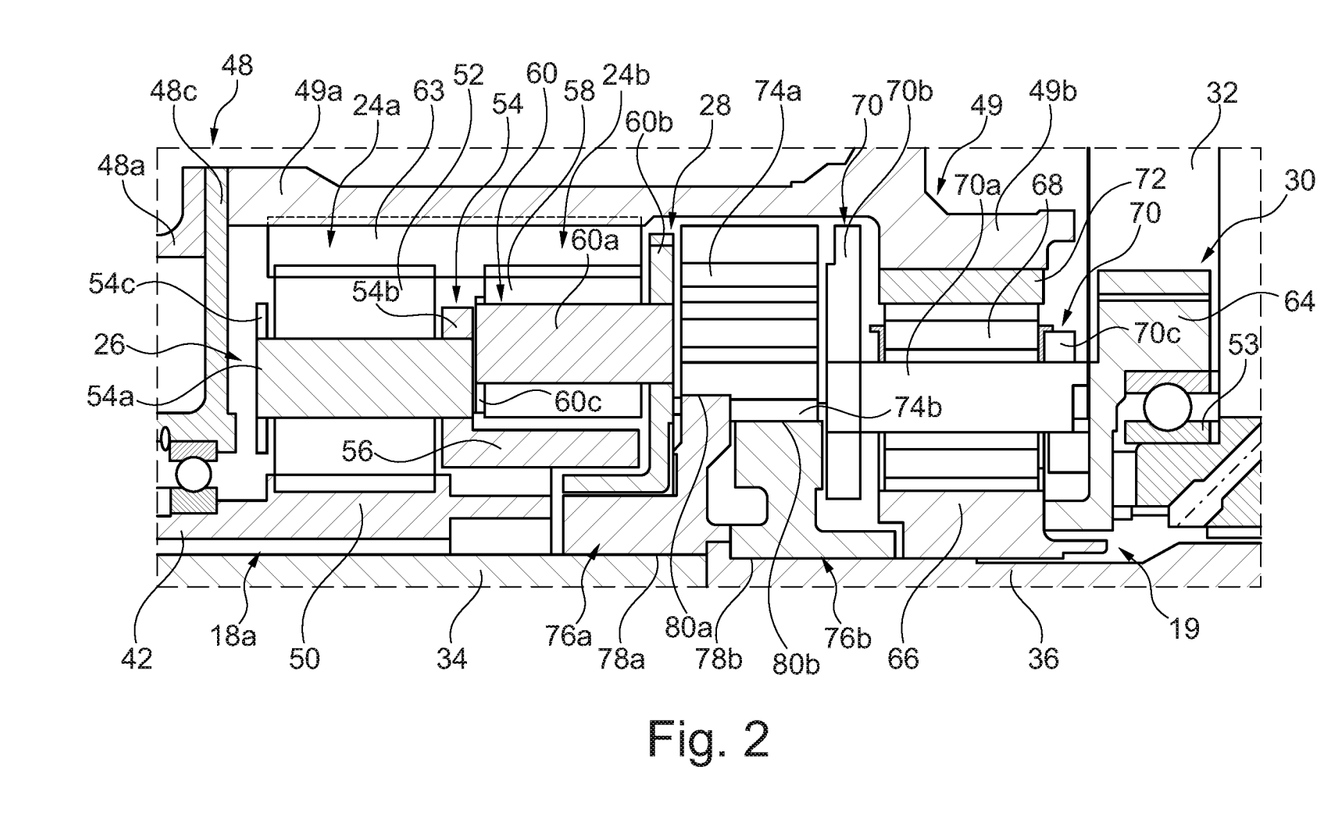
FIG. 2 shows an enlarged view of portions of a gearing subassembly, housings and axles of the hybrid motor vehicle drive train shown in FIG. 1.

FIG. 2 shows an enlarged view of portions of gearing subassembly 19, housings 48, 49 and axles 34, 36. First stage 24a includes a planetary sun gear 50 attached to the rotor shaft 42 at an axial end of shaft 42. In the embodiment in FIGS. 1 and 2, sun gear 50 is formed as a single piece with rotor shaft 42. Sun gear 50 is provided axially offset from rotor magnets 40 (FIG. 1) in the direction of the output 16a of transmission 16 (FIG. 1) outside of housing 48. Sun gear 50 includes teeth on the outer circumference thereof that drivingly engage teeth of planetary gears 52 of first stage 24a situated in a first stage planet carrier 54. Planetary gears 52 are driven to orbit sun gear 50 to drive planet carrier 54 about center axis CA. Planet carrier 54 includes a plurality of pins 54a, each of which passes through one of planetary gears 52, a radially extending base plate 54b fixed to a differential side of pins 54a and a radially extending support plate 54c fixed to a motor side of pins 54a. Planet carrier 54 is non-rotatably fixed to a sun gear 56 of second stage 24b. More specifically, an inner radial end of base plate 54b is fixed to second stage sun gear 56. In the embodiment shown in FIG. 2, sun gear 56 is formed as a single piece with base plate 54b.

The second stage sun gear 56 drives a second stage planetary gear 58. Sun gear 56 includes teeth on the outer surface thereof that drive teeth of planetary gears 58 of situated in a second stage planet carrier 60. A common ring gear 63 reacts torque from planetary gears 52, 58 of both stages 24a, 24b and is attached to gearing housing section 49a. In other embodiments, instead of a common ring gear 63, a separate ring gear can be provided for each of planetary gears 52, 58 if separate ring gears are more favorable for gearing. Planetary gears 58 are driven to orbit sun gear 56 to drive planet carrier 60 about center axis CA. Planet carrier 60 includes a plurality of pins 60a, each of which passes through one of planetary gears 58, a radially extending base plate 60b fixed to a differential side of pins 60a and a radially extending support plate 60c fixed to a motor side of pins 60a. Radially extending base plate 60b also forms part of a carrier 62 of differential 28.

On an opposite side of differential 28 as motor output gearing 26, transmission output gearing 30 is provided around axle 36 coupled to transmission output 16a via chain 32. Transmission output gearing 30 includes an input gear 64, which rests on bearing 53, whose outer surface is directly connectable to chain 32 and a sun gear 66 non-rotatably connected to input gear 64. Sun gear 66 includes teeth on the outer surface thereof that drive teeth of planetary gears 68 of situated in a second stage planet carrier 70. A ring gear 72 reacts torque from planetary gears 68 back to ground through the housing and is attached to gearing housing section 49b. Planetary gears 68 are driven to orbit sun gear 66 to drive planet carrier 70 about center axis CA. Planet carrier 70 includes a plurality of pins 70a, each of which passes through one of planetary gears 68, a radially extending base plate 70b fixed to a differential side of pins 70a and a radially extending support plate 70c fixed to an input side of pins 70a. Radially extending base plate 70b also forms part of carrier 62 of differential 28.

Differential carrier 62 further includes pins extending from base plate 60b to base plate 70b, with each pin extending through one of planetary gears 74a, 74b of differential 28 and extending through respective apertures in plates 60b, 70b. Planet gears 74a are in meshing engagement with planet gears 74b. Planet gears 74a are in meshing engagement with a first differential output hub 76a, which is non-rotatably fixed to an outer circumference of axle 34 via splines or teeth, and planet gears 74b are in meshing engagement with a second differential output hub 76b, which is non-rotatably fixed to an outer circumference of axle 36 via splines or teeth. Hubs 76a, 76b include respective inner spline profiles 78a, 78b and outer gear teeth profiles 80a, 80b. Inner spline profiles 78a, 78b share common pitch diameter the outer gear profiles 80a, 80b have different pitch diameters.

In the embodiment shown in FIGS. 1 and 2, power from e-motor 18 is combined with power from engine 12, as transmitted via torque converter 14 and transmission 16, in differential 28, which in the embodiment shown in FIGS. 1 and 2 is a spur gear differential. Torque flows from motor 18 through motor output gearing 26 into differential 28 and from engine 12 through transmission output gearing 30 into differential 28. Power is routed through differential 28 to allow for differences in wheel speeds. Torque flows from differential 28 into the axles 34, 36 to the wheels of the vehicle.

Figure 3:
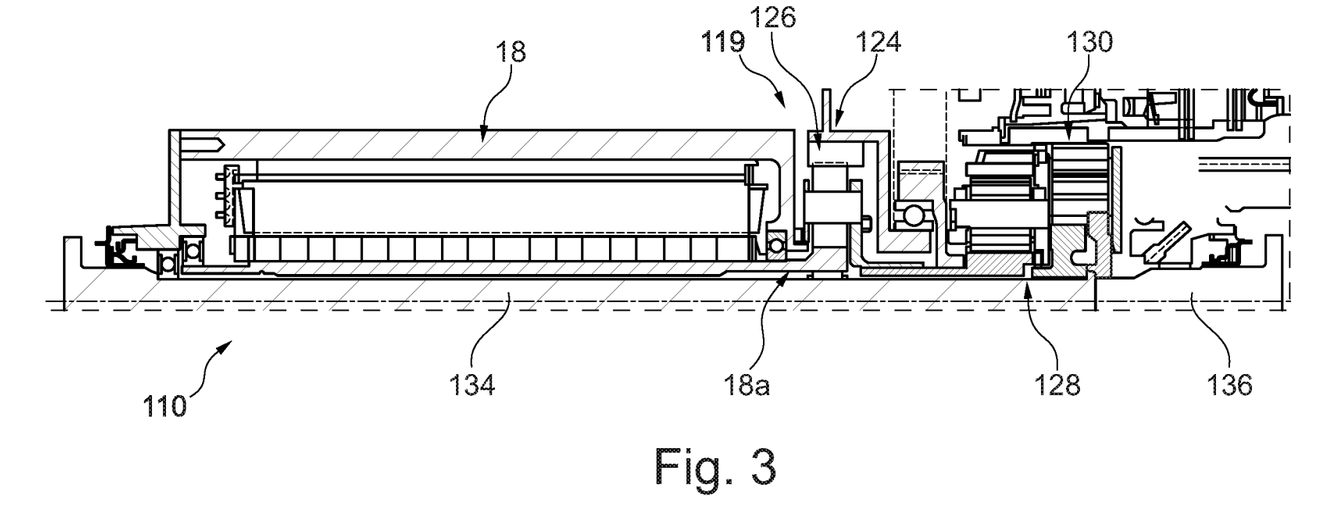
FIG. 3 shows an embodiment of a hybrid motor vehicle drive train in accordance with another embodiment of the present invention.

FIG. 3 shows a a portion of an embodiment of a hybrid motor vehicle drive train 110 in accordance with another embodiment of the present invention. Drive train 110 is configured in the same manner as drive train 10, except that drive train 110 includes a a gearing subassembly 119 that is different from gearing subassembly 19 and different axles 134, 136. Specifically, gearing subassembly 119 includes a motor output gearing 126, a differential 128 and a transmission output gearing 130 that are arranged and/or configured differently than in drive train 10 in FIGS. 1 and 2. In particular, motor output gearing 126 includes a single stage 124 and a transmission output gearing 130 is provided between motor 18 and differential 128, such that torque output by motor 18 transfers through both of gearings 126, 130 to differential 128. Additionally, in contrast to the drive train 10 shown in FIGS. 1 and 2, both of gearings 126, 130 are arranged surrounding axle 134.

Figure 4:
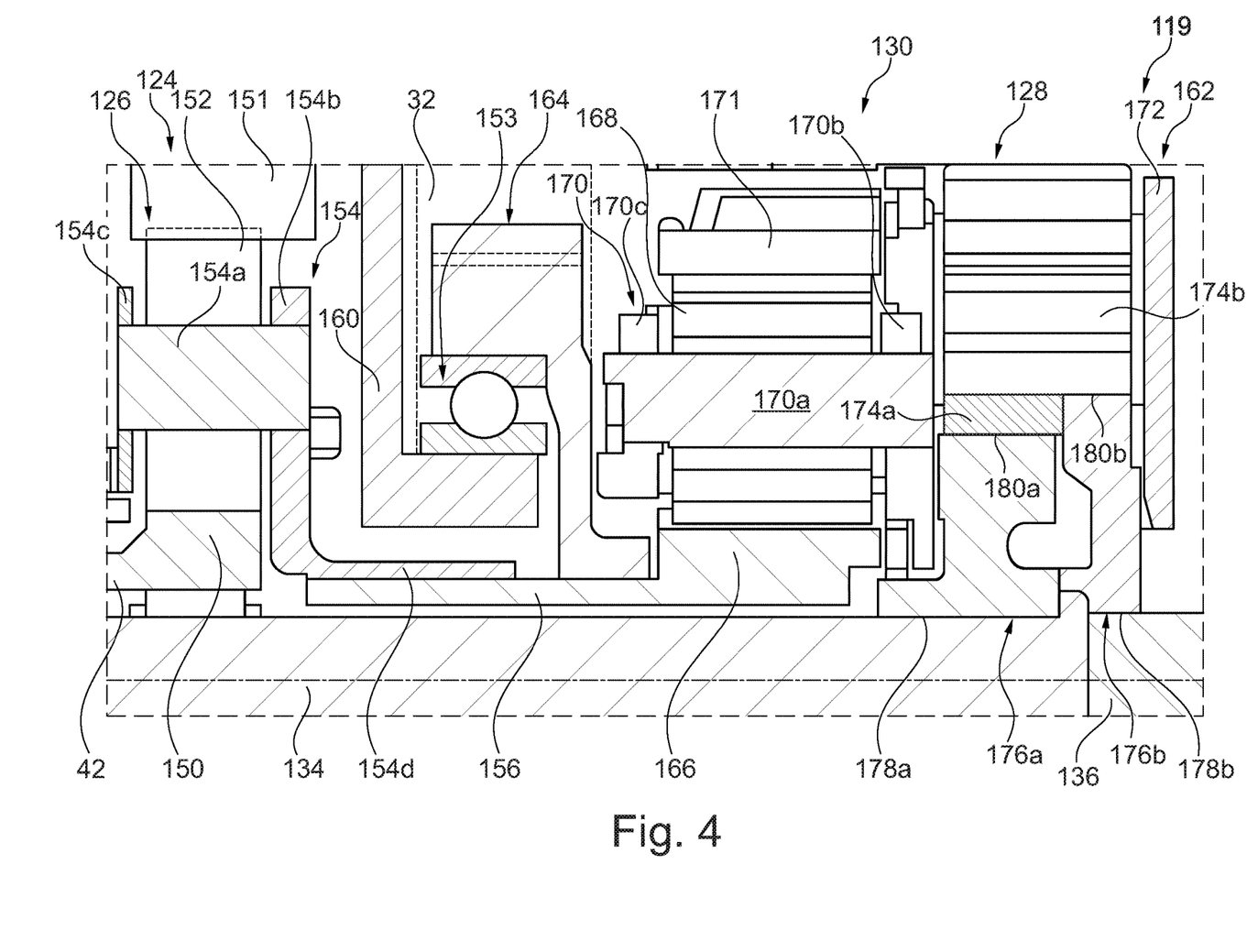
FIG. 4 shows an enlarged view of portions of a gearing subassembly, housings and axles of the hybrid motor vehicle drive train shown in FIG. 3.

FIG. 4 shows an enlarged view of gearing subassembly 119. Stage 124 of motor output gearing 126 includes a planetary sun gear 150 attached to the rotor shaft 42 at an axial end of shaft 42. In the embodiment in FIGS. 3 and 4, sun gear 150 is formed as a single piece with rotor shaft 42. Sun gear 150 is provided axially offset from rotor magnets 40 (FIG. 1) in the direction of the output 16a of transmission 16 (FIG. 1) outside of housing 48. Sun gear 150 includes teeth on the outer surface thereof that drive teeth of planetary gears 152 of stage 124 situated in a planet carrier 154. A ring gear 151 reacts torque from planetary gears 152 back to ground through the housing. Planetary gears 152 are driven to orbit sun gear 150 to drive planet carrier 154 about center axis CA (FIG. 1). Planet carrier 154 includes a plurality of pins 154a, each of which passes through one of planetary gears 152, a radially extending base plate 154b fixed to a differential side of pins 154a and a radially extending support plate 154c fixed to a motor side of pins 154a. Planet carrier 154 also includes an axially extending ring 154d non-rotatably fixed to an interconnection gear 156 for connecting the output 18a of motor 18 to the output 16a of transmission 16. More specifically, an inner surface of ring 154d is non-rotatably fixed an outer surface of interconnection gear 156.

Axially in between motor output gearing 126 and differential 128, transmission output gearing 130 is provided around axle 134 and coupled to transmission output 16a via chain 32. Transmission output gearing 130 includes an input gear 164 whose outer surface is directly connectable to chain 32 and a sun gear 166, which is non-rotatably connected to the output of input gear 164 and non-rotatably connected to the output of motor output gearing 126. More specificaly, an inner surface of input gear 164 is non-rotatably fixed to the outer surface of interconnection gear 156 and sun gear 166 is formed as a single piece with interconnection gear 156. Input gear 164 is rotatably supported on a housing section 160 via a bearing 153. Sun gear 166 includes teeth on the outer surface thereof that drive teeth of planetary gears 168 of situated in a planet carrier 170. A ring gear 171 reacts torque from planetary gears 168. Planetary gears 168 are driven to orbit sun gear 166 to drive planet carrier 170 about center axis CA. Planet carrier 170 includes a plurality of pins 170a, each of which passes through one of planetary gears 168, a radially extending base plate 170b fixed to a differential side of pins 170a and a radially extending support plate 170c fixed to an input side of pins 170a. Radially extending base plate 170b also forms part of a carrier 162 of differential 128.

Differential carrier 162 further includes pins extending from base plate 170b to a base plate 172 surrounding axle 136, with each pin extending through one of planetary gears 174a, 174b of differential 128 and extending through respective apertures in plates 170b, 172. Planet gears 174a are in meshing engagement with planet gears 174b. Planet gears 174a are in meshing engagement with a first differential output hub 176a, which is non-rotatably fixed to an outer circumference of axle 134 via splines or teeth, and planet gears 174b are in meshing engagement with a second differential output hub 176b, which is non-rotatably fixed to an outer circumference of axle 136 via splines or teeth. Hubs 176a, 176b include respective inner spline profiles 178a, 178b and outer gear teeth profiles 180a, 180b. Inner spline profiles 178a, 178b share a common pitch diameter and the outer gear profiles 180a, 180b have different pitch diameters.

In the embodiment shown in FIGS. 3 and 4, power from e-motor 18 is combined with power from engine 12, as transmitted via torque converter 14 and transmission 16, at interconnection gear 156 and transmitted via transmission output gearing 130 to differential 128, which in the embodiment shown in FIGS. 3 and 4 is a spur gear differential. Torque flows from motor 18 through motor output gearing 126 and transmission output gearing 130 into differential 128 and from engine 12 through transmission output gearing 130 into differential 128. Power is routed through differential 128 to allow for differences in wheel speeds. Torque flows from differential 128 into the axles 134, 136 to the wheels of the vehicle.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

LIST OF REFERENCE NUMERALS

CA center axis
10 hybrid motor vehicle drive train
12 internal combustion engine
14 torque converter
16 transmission
16a transmission output
16b transmission housing
17 hybrid drive train assembly
18 electric motor
18a electric motor output
19 gearing subassembly
20 stator
22 rotor
24a first motor gearing stage
24b second motor gearing stage
26 motor output gearing
28 differential
30 transmission output gearing
32 chain or belt
34 front axle
36 front axle
40 magnets
42 hollow shaft
44 bearing
46 bearing
47 axle bearing
48 motor housing
48a axially and circumferentially extending base section
48b first support section
48c second support section
49 gearing housing
49a first gearing housing section
49b second gearing housing section
49c third gearing housing section
49d hub section
50 sun gear
51a fasteners
51b fasteners
51c fasteners
52 planetary gears
53 bearing
54 planet carrier
54a pins
54b base plate
54c support plate
56 sun gear
58 planetary gears
60 planet carrier
60a pins
60b base plate
60c support plate
62 differential carrier
63 common ring gear
64 input gear
66 sun gear
68 planetary gears
70 planet carrier
70a pins
70b base plate
70c support plate
72 ring gear
74a planetary gears
74b planetary gears
76a first differential output hub
76b second differential output hub
78a first inner spline profile
78b second inner spline profile
80a first outer spline profile
80b second outer spline profile
110 drive train
119 gearing subassembly
124 output gearing stage
126 motor output gearing
128 differential 128
130 transmission output gearing
134 front axle
136 front axle
150 sun gear
151 ring gear
152 planetary gears
153 bearing
154 planet carrier
154a pins
154b base plate
154c support plate
154d axially extending ring
156 interconnection gear
160 housing section
162 differential carrier
164 input gear
166 sun gear
168 planetary gears
170 planet carrier
171 ring gear
170a pins
170b base plate
170c support plate
172 differential base plate
174a planetary gears
174b planetary gears
176a first differential output hub
176b second differential output hub
178a first inner spline profile
178b second inner spline profile
180a first outer spline profile
180b second outer spline profile

What is claimed is:

1. A hybrid drive train assembly for a motor vehicle drive train comprising:
an electric motor;
a differential configured for connecting a first front axle and a second front axle of the motor vehicle drive train to each other;
a motor output gearing connecting an output of the electric motor to the differential; and
a transmission output gearing configured for drivingly connecting an output of a transmission of an internal combustion engine to the differential for transmitting torque from the transmission to the differential,
wherein the electric motor, the motor output gearing and the transmission output gearing are configured for radially surrounding the first or second front axles.

2. The hybrid drive train assembly as recited in claim 1 wherein the electric motor includes a stator and a rotor, the rotor including a hollow drive shaft, an end of the hollow drive shaft being connected to the motor output gearing.

3. The hybrid drive train assembly as recited in claim 2 wherein the motor output gearing includes a sun gear connected to the end of the hollow drive shaft.

4. The hybrid drive train assembly as recited in claim 3 wherein the motor output gearing includes planetary gears rotatably supported on teeth of the sun gear.

5. The hybrid drive train assembly as recited in claim 1 wherein the transmission output gearing includes an input gear configured for connecting to the output of the transmission.

6. The hybrid drive train assembly as recited in claim 5 wherein the transmission output gearing includes a sun gear configured for transferring torque from the input gear to planetary gears rotatably supported on teeth of the sun gear.

7. The hybrid drive train assembly as recited in claim 6 wherein the motor output gearing includes a planet carrier non-rotatably fixed to a differential carrier of the differential.

8. The hybrid drive train assembly as recited in claim 1 wherein the electric motor and the motor output gearing are configured for radially surrounding the first front axle.

9. The hybrid drive train assembly as recited in claim 8 wherein the transmission output gearing is configured for radially surrounding the first front axle.

10. The hybrid drive train assembly as recited in claim 8 wherein the transmission output gearing is configured for radially surrounding the second front axle.

11. The hybrid drive train assembly as recited in claim 1 wherein the differential includes a first output hub configured for connecting to an outer circumferential surface of the first axle and a second output hub configured for connecting to an outer circumferential surface of the second axle.

12. The hybrid drive train assembly as recited in claim 1 wherein the transmission output gearing is directly drivingly connected to the differential.

13. The hybrid drive train assembly as recited in claim 12 wherein the motor output gearing is directly drivingly connected to the differential.

14. The hybrid drive train assembly as recited in claim 13 wherein the motor output gearing is drivingly connected to the differential via the transmission output gearing.

15. A method of constructing the hybrid drive train assembly of claim 1, the method comprising:
providing the differential configured for connecting the first front axle and the second front axle of the motor vehicle drive train to each other;
connecting the motor output gearing to the output of the electric motor; and
connecting the transmission output gearing to the differential, wherein the electric motor includes a stator and a rotor, the rotor including a hollow drive shaft, the connecting of the motor output gearing to the output of the electric motor including connecting an end of the hollow drive shaft to the motor output gearing.

16. The method as recited in claim 15 wherein the motor output gearing includes a sun gear fixed to the end of the hollow drive shaft.

17. The method as recited in claim 15 wherein the connecting of the transmission output gearing to the differential includes directly drivingly connecting the transmission output gearing to the differential.

18. The method as recited in claim 17 further comprising directly drivingly connecting the motor output gearing to the differential or drivingly connecting the motor output gearing to the differential via the transmission output gearing.

19. A hybrid drive train assembly for a motor vehicle drive train comprising:
an electric motor;
a differential configured for connecting a first front axle and a second front axle of the motor vehicle drive train to each other;
a motor output gearing connecting an output of the electric motor to the differential; and
a transmission output gearing configured for connecting an output of a transmission to the differential,
wherein the transmission output gearing includes an input gear configured for connecting to the output of the transmission,
wherein the transmission output gearing includes a sun gear configured for transferring torque from the input gear to planetary gears rotatably supported on teeth of the sun gear.

20. A hybrid drive train assembly for a motor vehicle drive train comprising:
an electric motor;
a differential configured for connecting a first front axle and a second front axle of the motor vehicle drive train to each other;
a motor output gearing connecting an output of the electric motor to the differential; and
a transmission output gearing configured for connecting an output of a transmission to the differential,
wherein the differential includes a first output hub configured for connecting to an outer circumferential surface of the first axle and a second output hub configured for connecting to an outer circumferential surface of the second axle.

* * * * *